Dec. 17, 1946.  M. SADOWSKY  2,412,654
LUMINESCENT SCREEN AND METHOD OF MANUFACTURE
Filed Feb. 27, 1942
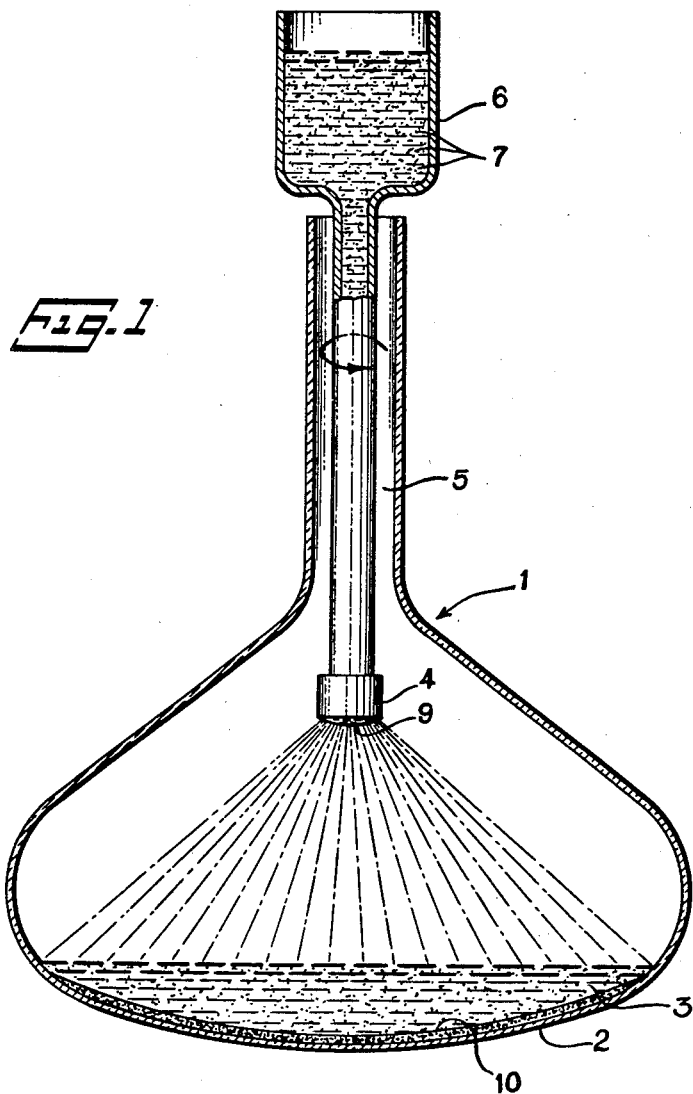
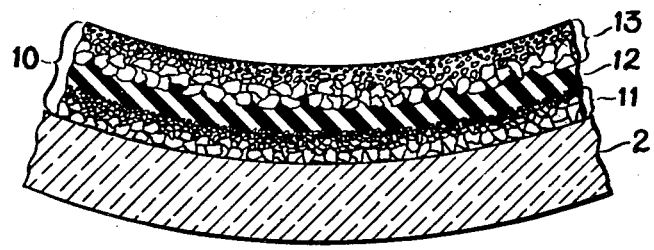
INVENTOR
*Meier Sadowsky.*
BY
ATTORNEY Patented Dec. 17, 1946

2,412,654

UNITED STATES PATENT OFFICE 2,412,654

LUMINESCENT SCREEN AND METHOD OF MANUFACTURE

Meier Sadowsky, New York, N. Y., assignor to Radio Corporation of America, a corporation of Delaware Application February 27, 1942, Serial No. 432,600

10 Claims. (Cl. 250—80)

My invention relates to luminescent phosphor screens and particularly to improved screens and methods of depositing phosphor materials and phosphor binder layers in cathode ray tube and luminescent screen manufacture.

Luminescent materials, sometime called phosphors, when applied in a conventional manner, such as by spraying a binder suspension of the phosphor material upon a screen foundation provide relatively poor contrast when the material is used as a luminescent screen in conventional cathode ray tubes in comparison with screens deposited by settling of the phosphor material through a liquid into contact with the foundation. The technique of settling a phosphor material for cathode ray screen manufacture comprises, in essence, suspending the powdered phosphor material in a liquid, such as water, in a bulb container or tube envelope, allowing the material to settle through the liquid and upon the surface of the bulb, and then decanting or siphoning off of the liquid. I have found that in utilizing such a method the phosphor material has a great tendency to pull away from the surface on which it is deposited particularly during the decanting or siphoning process. This is particularly true where large size phosphor particles or crystals comprise the settled material, and also where two or more layers of different phosphor materials are deposited by a settling process one upon the other to form a cascade screen, such as is used in aircraft position and distance indicating equipment. In addition, it is very desirable to form electron impermeable transparent barrier layers between various layers of phosphor material as described by H. W. Leverenz in his copending application, Serial No. 417,269, filed October 31, 1941.

It is an object of my invention to provide a sturdy luminescent screen particularly of the cascade type which is more rugged than conventional screens and which may be manufactured rapidly and with ease. It is another object to provide a method of depositing phosphor layers in combination with phosphor binder layers and electron impermeable barrier layers. It is a further object to provide a method of settling a phosphor from a liquid suspension or solution to obtain multiple layer phosphor screens having intermediate binder or barrier layers and it is a still further object to provide an improved method of forming rapidly and with a minimum of care and attention a plurality of phosphor layers which are firmly adherent to a base member.

In accordance with my invention I settle a phosphor material through a binder solution into contact with the container to form a layer of phosphor material and while maintaining the binder solution in contact with the settled phosphor material, I precipitate a binder material from the solution to form a uniform barrier layer in contact with the deposited phosphor layer. In accordance with a further teaching of my invention and immediately following the formation of the barrier layer I deposit additional phosphor material to form a second phosphor layer in contact with and firmly bound to the barrier layer which is in contact with the phosphor layer first deposited. By following my process I produce a phosphor layer which is compact and firmly adherent to the screen foundation and I also produce a second phosphor layer which is more loosely compacted than the first layer while being adequately bonded to the compact first layer. These and other objects, features and advantages of my invention will become apparent when considered in view of the following description and the accompanying drawing wherein Figure 1 shows an apparatus suitable for practicing a portion of my method, and Figure 2 shows in greatly enlarged detail a cross-sectional portion of a phosphor screen made in accordance with my invention.

Referring to Figure 1, I have shown a cathode ray tube envelope or bulb I having an end wall 2 on the inner surface of which it is desired to form a luminescent phosphor screen. The end wall 2 may be flat or shaped as a spherical surface of varying curvature to better withstand atmospheric pressure to which it is subjected after the evacuation of the bulb during cathode ray tube manufacture. It has been customary to deposit various phosphor materials from a water suspension by introducing the suspension into the bulb in contact with the end wall 2 and allowing the phosphor material in the suspension to settle through the water by gravitational forces into contact with the end wall without disturbing or jarring the bulb during the settling process.

In accordance with my invention I introduce into the bulb I a quantity of clear binder solution, that is, a solution without any suspended phosphor material therein. The said binder solution is preferably an aqueous solution of a metal silicate, such as potassium silicate, and I then distribute over the surface of this solution a liquid suspension containing the phosphor material to be deposited by settling. The function of the solution upon which the liquid suspension containing the phosphor material is distributed is three-fold, namely, to cushion the impact of the phosphor-liquid suspension, to provide a binder material in contact with both the surface on which the phosphor is deposited and in contact with the individual phosphor particles or crystals and to provide a source for the formation of an intermediate binder or barrier layer. Therefore, to meet the first requirement and prior to the introduction of the suspension of phosphor material into the bulb, I cover the surface of the bulb with the binder solution to a depth of at least ½ inch or more to act as a cushion.

Referring again to Figure 1, I cover the end wall 2 of the bulb 1 to a depth of at least ½ inch or more with a solution 3, such as a solution of potassium silicate in water. I then introduce an aqueous suspension and distribute the suspension over the exposed surface of the solution 3. A convenient apparatus for introducing and distributing the suspension is shown in Figure 1 and comprises an elongated funnel having a nozzle portion 4, a neck portion 5 and a reservoir 6. The nozzle and neck portions of the funnel are of sufficiently small diameter to fit within the neck of the bulb, and the nozzle is inserted into the bulb neck with its apertured end portion 3 to 4 inches from the surface of the solution 3. The phosphor material 7 to be deposited by settling is thoroughly agitated with a liquid, such as water, to provide a suspension of the phosphor material in the liquid which is immediately introduced into the reservoir 6 of the funnel shown in Figure 1. The nozzle portion 4 is preferably of convex spherical shape as viewed from the end wall side and is provided with a number of orifices 9 whose axes are normal to the end surface of the nozzle. The actual distance between the nozzle and the surface of the solution 3 is such that for any particular orifice size and configuration the entire surface of the solution will receive substantially the same amount of suspension per unit area. Immediately upon introduction of the suspension into the reservoir 6 I rotate the funnel rapidly and continue this rotation as long as the suspension is passing through the orifices. Thus, if the funnel is held stationary, a concentration of the material will occur adjacent the points of impact of the fine streams of suspension issuing from the nozzle portion of the funnel; whereas by rotating the funnel as long as the suspension is passing through the orifices greater uniformity of distribution is assured. I have found that it is necessary to maintain sufficient "head" or height of suspension in the funnel to insure a pressure sufficiently great to force the streams through the orifices substantially perpendicular to the surface of the nozzle. If the pressure or head becomes too low, the suspension tends to collect on the surface of the nozzle and falls in large drops, thereby causing splashing and loss of uniformity. To avoid this condition and prior to the introduction of the suspension into the funnel, I fill the funnel with clear water and likewise maintain the funnel full following the distribution of the suspension by adding water following the suspension distribution before the height of the liquid in the neck portion 5 reaches a minimum level at which large drops collect on and fall from the nozzle. One funnel which has been found particularly satisfactory for use in making 5- to 12-inch diameter screens is provided with a neck portion 18 inches in length, the nozzle having 30 orifices, each 0.013 to 0.014 inch in diameter. With this funnel, dripping occurs when the head falls to less than 16 inches and under proper head the nozzle passes the suspension at a rate of 11.8 milliliters per second.

Following the distribution of the aqueous suspension of the phosphor over the surface of the solution 3 and during the settling of the phosphor through the solution 3, I maintain the bulb 1 and the solution in a state of rest until the phosphor material 7 falls into contact with the end wall 2 to form a layer of the phosphor screen 10.

Following a period of time, such as 5 minutes or more, depending upon the size of the phosphor particles, sufficient to allow substantially all of the phosphor material to settle into contact with the end wall 2, I introduce within the bulb 1 and distribute over the surface of the solution 3 a solution which in with the solute of the solution 3 will produce a slight precipitate or gel which settles into contact with the previously deposited phosphor layer. More particularly I prefer to use an alum solution, such as potassium aluminum sulphate, which is dissolved in water and introduced through the nozzle 4 in the same manner as the previously introduced phosphor suspension, the alum reacting with the silicate 3 to form potassium aluminum silicate.

While I do not wish to be limited to any particular theory to explain the action ensuing upon the introduction of the alum solution, it appears that the solution 3 is rendered slightly cloudy either by the formation of a precipitate, a gel or a dragging agent which settles upon and in contact with the previously deposited phosphor layer. This precipitate effectively forms a barrier layer which is effective in absorbing electron energy prior to its incidence upon the previously deposited first layer. In addition this barrier layer appears to draw the phosphor particles of the first phosphor layer together, form a very compact phosphor layer, firmly contract the particles one with another, and attach the phosphor layer to the foundation or end wall 2.

Following a period of time sufficient to allow the precipitate or gel to settle upon the previously deposited first phosphor layer, I distribute a second phosphor aqueous suspension over the exposed surface of the solution 3 in the same manner as used in distributing the first phosphor solution. It will be noted from the above steps that the total quantity of liquid including the ½ inch or more cushioning liquid, the liquid in which the first phosphor material is suspended, and the liquid of the alum suspension is rather large so that in tubes wherein the entire area of the end wall 2 is to be provided with a screen and the conical portion of the bulb allows a minimum of solution depth, the first phosphor layer may be mixed as a suspension with the solution 3 rather than by distributing it over the surface of the solution. Such a modification, however, of my process results in a somewhat non-uniform distribution of the phosphor material and should be avoided if at all possible. Alternately the second phosphor material may be distributed as an aqueous suspension prior to the complete settling of the precipitate so that it falls through a portion of the precipitate.

As referred to above, the solution 3 which is first introduced into contact with the end wall 2 is preferably a solution of potassium silicate in water. I have obtained very good results using a potassium silicate furnished by the Philadelphia Quartz Co. under their grade of "very pure." The solution 3 is prepared by mixing 8 milliliters of the potassium silicate as furnished with sufficient water to provide a cushioning layer at least ½ inch in thickness and preferably to a thickness of approximately 2 centimeters. In a conventional 5 inch diameter cathode ray tube envelope, this depth of solution is equal to approximately 230 milliliters. The quantity of phosphor material deposited as a first layer is dependent upon the desired thickness and I have found a thickness corresponding to 12 milligrams of phosphor per square centimeter sufficient for cascade screen applications. Depending upon the area of the screen to be formed, I form a suspension of the required quantity of phosphor material in water and in the preferred procedure distribute the suspension over the surface of the potassium silicate solution. As indicated above, the alum solution, such as a solution of potassium aluminum sulphate in water, is distributed over the surface of the potassium silicate solution following settling of the first layer phosphor material. To prepare the alum solution I dissolve 100 milligrams of potassium aluminum sulphate in water, this quantity being particularly adapted for use with the quantity of potassium silicate referred to above. It is noted that on a weight bases, the amount of potassium aluminum silicate is 1/200 of the amount of potassium silicate so that a great excess of potassium silicate remains in the solution 3 following the introduction of the potassium aluminum sulphate. Depending upon the desired thickness of the barrier layer between the two phosphor layers, the ratio of alum to the potassium silicate may be varied over wide limits, such as one part to a thousand up to one part in ten. Furthermore, while I have specifically referred to potassium silicate as a solute in the solution 3, it will be appreciated that other alums in addition to potassium aluminum sulphate may be used, such as an alum wherein the potassium is replaced by other alkali metals.

Following the settling of the phosphor material to form the second layer, I may repeat the process of settling additional phosphor layers either with or without the formation of intermediate barrier or binder layers to provide luminescent screens having more than two phosphor layers. Following the settling of the final phosphor layer, I remove the solution solvents or liquids through which the phosphor material has been settled either by decanting or preferably by siphoning the liquid from the bulb. I have found that a period of time, such as several hours, may preferably elapse between the final settling step and the removal of the liquid. It appears that the longer the bulb remains in an undisturbed condition, the more firmly attached is the phosphor screen, although sufficient attachment is obtained by allowing the bulb to be undisturbed for approximately four hours. The bulb may then be placed upon a platform and tilted simultaneously with the siphoning of the liquid from the screen. For example, the bulb may be tilted 10 degrees and siphoned as far as possible, tilted 5 degrees more and again siphoned; these steps being repeated until all of the liquid is removed from the screen. Care should be exercised during the siphoning process to prevent return of any of the liquid through the siphon, and I have found it desirable to siphon and simultaneously dry the screen with a flow of warm dry air so that any danger of sliding of the phosphor material, which might be induced by the siphoning step, is minimized. Prior to removal of the bulb from the platform on which it is tilted, the screen is thoroughly dried so that upon removal, there will be no tendency for the phosphor particles to be washed from the end wall of the bulb. My invention not only facilitates the removal of the water following settling but greatly reduces the time required for such removal and in addition eliminates the careful technique and attention usually required in the manufacture of settled luminescent screens.

Referring particularly to Figure 2 which shows an enlarged fragmentary portion of the luminescent screen 10, it will be noted that the first phosphor layer 11 is shown as being directly applied to the end wall or foundation 2. Actually inasmuch as the material forming the phosphor layer 11 is settled through a binder solution, there may be an exceedingly thin film of this binder between the layer 11 and the foundation 2. Obviously during the settling process of the material comprising the layer 11 the larger particles, provided the finely divided phosphor is not carefully graded as to size, first settle into contact with the end wall 2, the smaller particles of phosphor material settling later. Thus, the particle size of the layer 11 is graduated from the larger particles in contact with the end wall 2 to smaller particles which form the opposite side of the layer 11. The layer 12 represents the barrier or binding layer between the first phosphor layer 11 and the second phosphor layer 13. This barrier layer may be of any desired thickness depending upon the energy of the electron beam used for exciting the screen and is preferably of sufficient thickness to prevent material penetration of the beam into the first layer 11. The phosphor particles of the second layer 13 are more loosely packed than are those of the first layer 11 as indicated above, although the distribution in particle size is substantially the same, the larger particles of this layer being in contact with the barrier layer 12 graduating in size to the smaller particles which form the exposed surface of the layer. The greater density, that is, the more solidly packed layer 11, is preferably occasioned by a shrinking action of the barrier layer either following its application or during the drying of this layer; although if such shrinking occurs during the drying process, it might be expected that the second layer would likewise be packed in the same manner. Such an expected result does not occur. Actually only the first layer 11 is compacted when the barrier layer is applied in accordance with my invention, whereas luminescent screens not made in accordance with my invention, and when using the same material for each layer, the first layer is of substantially the same density, texture and thickness as the second layer. Furthermore actual measurements show that for a given quantity of phosphor material forming the second layer, substantially the same density and thickness of the second layer is produced whether the intermediate barrier or binder is present or not. Actual measurements indicate that for a given quantity of first layer material, such as 12 and 8 milligrams per square centimeter respectively for the first and second layers, the first layer has a thickness of from 70 to 75 microns and a second layer thickness of 25 to 30 microns in screens not made in accordance with my invention. However, when utilizing my invention and the same quantities of materials for the two layers, the first layer has a thickness of 50 to 55 microns showing that considerable shrinking or packing of this layer has been obtained by my method. However, the second layer has the same thickness of 25 to 30 microns, irrespective of the method used in forming the barrier layer. Thus, the first layer 11 is compacted and held in compression by the barrier layer 12 to a much greater degree than the second layer 13. Thus, when I refer to the material of the first layer as being more closely packed than the material of the second layer, I mean that the particles on the average are more closely packed notwithstanding the gradation of particle size in each of the two layers.

While I have described my invention with particular references to the manufacture of luminescent screens for use in cathode ray tubes, it will be appreciated that my method of application and the resultant structure may be used to equal advantage in other applications, such as in luminescent lamps or in devices wherein the excitation of the screen is by means other than cathode rays, such as other corpuscular energy or radiant energy as in the case of conventional luminescent lamps, without departing from the spirit of my invention or the scope thereof as set forth in the appended claims.

I claim:

1. The method of making a luminescent screen comprising the steps of covering a substantially horizontal foundation with a liquid solution containing a solute capable of being precipitated, distributing a phosphor material over the exposed surface of said solution, allowing at least a portion of said phosphor material to settle into contact with said foundation, adding a precipitant to said solution to form a precipitate, allowing said precipitate to settle into contact with said phosphor material and removing the liquid from said foundation.

2. The method of making a luminescent screen comprising covering a screen foundation with a liquid binder solution, settling a phosphor material through said solution into contact with said foundation, adding a material which will form a precipitate with said binder solution, allowing said precipitate to settle into contact with said phosphor material and removing the solvent of said solution from said foundation.

3. The method of making a luminescent screen comprising the steps of covering a substantially horizontal screen foundation with a silicate binder solution, settling a luminescent material through said solution into contact with said foundation, distributing an alum solution over the exposed surface of said binder solution to form a precipitate, allowing at least a portion of said precipitate to settle into contact with the settled phosphor material and removing the solvent of said solution from said foundation.

4. The method of making a luminescent screen comprising the steps recited in claim 3 wherein the quantity of alum solution distributed over said binder solution is insufficient for a complete chemical reaction with the solute in said binder solution.

5. The method of making a luminescent screen comprising settling a finely divided phosphor material through a silicate binder solution to form a first phosphor layer, adding a precipitant to said solution to form a siliceous precipitate, settling additional finely divided phosphor material through said solution and said precipitate to form a second phosphor layer wherein the phosphor particles of said additional material are covered with a siliceous coating, and removing the solvent of said binder solution from said phosphor materials.

6. The method of making a luminescent screen comprising the steps of distributing over the surface of a silicate binder solution a liquid suspension of finely divided phosphor material, interrupting the fall of said material through said solution on a screen foundation, distributing an alum solution over the surface of said binder solution to form a siliceous precipitate, allowing a portion of said precipitate to fall into contact with said phosphor material, distributing a second liquid suspension of phosphor material over the surface of said binder solution containing a portion of said precipitate and allowing the phosphor material to settle through said binder solution and said precipitate portion into contact with the portion of said precipitate already in contact with said first-mentioned phosphor material and removing the solvent of said binder solution from said foundation.

7. The method of depositing a phosphor on the inner end wall of a cathode ray tube envelope comprising admitting a binder solution to substantially cover the end wall of the envelope when said envelope is in an inverted vertical position with the end wall substantially horizontal, depositing on said solution an aqueous suspension of finely divided phosphor material, allowing said material to settle into contact with said end wall, distributing an alum solution over the surface of said binder solution to form a siliceous precipitate, settling additional finely divided material through said solution and said precipitate, and removing the solvents of said solutions from said envelope.

8. A luminescent screen comprising a first layer of phosphor material of graduated particle size on a foundation, the larger particles being in contact with said foundation, a layer of binder material in contact with the smaller particles of said first layer, a second layer of phosphor material of varying particle size in contact with said binder layer, the smaller particles of said first layer being held in compression by said binder layer and being more closely packed together than the particles of said second layer.

9. A luminescent screen comprising a layer of graduated particle size phosphor material on a screen foundation with the larger particles more nearly adjacent said foundation, a binder layer on the smaller particles of said first layer, a second layer of graduated particle size phosphor material, the larger particles of which are in contact with said binder layer, the smaller particles of said first layer being shrunk together by said binder layer to a closer extent than the particles of said second layer.

10. A luminescent screen comprising two adjacent layers of luminescent material, the particles of each layer being graduated from larger to smaller size, a binder layer between the smaller particles of one layer and the larger particles of the other layer, said binder acting to shrink the smaller particles of said one of said layers together whereby the smaller particles of said one layer have smaller voids between the particles than the smaller particles of said other layer.

MEIER SADOWSKY.